United States Patent [19]

Chapin

[11] Patent Number: 5,343,343
[45] Date of Patent: Aug. 30, 1994

[54] AIR BEARING SLIDER WITH RELIEVED RAIL ENDS

[75] Inventor: Robert E. Chapin, Burnsville, Minn.

[73] Assignee: Seagate Technology, Inc., Scotts Valley, Calif.

[21] Appl. No.: 44,926

[22] Filed: Apr. 8, 1993

Related U.S. Application Data

[63] Continuation of Ser. No. 715,453, Jun. 15, 1991, abandoned, which is a continuation-in-part of Ser. No. 528,925, May 25, 1990, Pat. No. 5,128,822, and Ser. No. 528,936, May 25, 1990, Pat. No. 5,062,017.

[51] Int. Cl.$^5$ ............................................. G11B 21/21
[52] U.S. Cl. ............................................. 360/103
[58] Field of Search ............................................. 360/103, 122

[56] References Cited

U.S. PATENT DOCUMENTS

| | | | |
|---|---|---|---|
| 3,197,751 | 7/1965 | Felts | 340/174.1 |
| 3,573,768 | 4/1971 | Harris | 340/174.1 |
| 3,855,625 | 12/1974 | Garnier et al. | 360/103 |
| 4,218,715 | 8/1980 | Garnier | 360/103 |
| 4,420,780 | 12/1983 | Deckert | 360/103 |
| 4,553,184 | 11/1985 | Ogishima | 360/103 |
| 4,555,739 | 11/1985 | Le Van et al. | 360/103 |
| 4,636,894 | 1/1987 | Mo | 360/103 |
| 4,644,641 | 2/1987 | Verdone | 29/603 |
| 4,646,180 | 2/1987 | Ohtsubo | 360/103 |
| 4,673,996 | 6/1987 | White | 360/103 |
| 4,734,803 | 3/1988 | Nishihira | 360/103 |
| 4,802,042 | 1/1989 | Strom | 360/103 |
| 4,851,942 | 7/1989 | Kumasaka et al. | 360/103 |
| 4,870,519 | 9/1989 | White | 360/103 |
| 4,893,204 | 1/1990 | Yamada et al. | 360/103 |
| 4,894,740 | 1/1990 | Chhabra et al. | 360/103 |
| 5,019,930 | 5/1991 | Takeya | 360/103 |
| 5,097,370 | 3/1992 | Hsia | 360/103 |
| 5,267,109 | 11/1993 | Chapin et al. | 360/103 |

FOREIGN PATENT DOCUMENTS

| | | | |
|---|---|---|---|
| 55-105858 | 8/1980 | Japan | 360/103 |
| 59-3744 | 1/1984 | Japan | 360/103 |
| 59-221871 | 12/1984 | Japan | 360/103 |
| 60-101781 | 6/1985 | Japan | 360/103 |
| 60-109073 | 6/1985 | Japan | 360/103 |
| 60-131613 | 7/1985 | Japan | 360/103 |
| 61-204878 | 9/1986 | Japan | 360/103 |
| 62-110680 | 5/1987 | Japan | 360/103 |
| 63-268128 | 11/1988 | Japan | 360/103 |
| 1-116959 | 5/1989 | Japan | 360/103 |
| 1-211383 | 8/1989 | Japan . | |
| 1-245480 | 9/1989 | Japan | 360/103 |
| 2-49281 | 2/1990 | Japan | 360/103 |
| 3-63978 | 3/1991 | Japan | 360/103 |
| 3-132981 | 6/1991 | Japan | 360/103 |

OTHER PUBLICATIONS

Research Disclosure, Roll Intensive Slider Design for Improved Disk File Reliability, Nov. 1985, p. 596.

Primary Examiner—John H. Wolff
Assistant Examiner—Craig A. Renner
Attorney, Agent, or Firm—Kinney & Lange

[57] ABSTRACT

A self-loading slider supports a transducer proximate a rotating disc. The slider includes a slider body having a leading edge, a trailing edge and first and second side edges. First and second side rails are positioned along the first and second side edges, respectively. The first and second side rails form coplanar air bearing surfaces. A cross rail extends between the first and second side rails to form a negative pressure cavity between the cross rail, the trailing edge and the first and second side rails. First and second trailing edge reliefs are formed within the first and second side rails, respectively. Each relief extends into a portion of the side rail from the negative pressure cavity, at the trailing edge to form first and second rail end portions adjacent the first and second side edges. The first and second rail end portions extend the air bearing surfaces to the trailing edge of the slider.

29 Claims, 4 Drawing Sheets

AIR BEARING SLIDER WITH RELIEVED RAIL ENDS

CROSS REFERENCE TO COPENDING APPLICATION

This is a continuation of U.S. patent application Ser. No. 07/715,453 filed on Jun. 14, 1991, abandoned which is a continuation-in-part of U.S. patent application Ser. No. 07/528,925, filed May 25, 1990, which issued as U.S. Pat. No. 5,128,822, and of U.S. patent application Ser. No. 07/528,936, filed May 25, 1990, which issued as U.S. Pat. No. 5,062,017.

Reference is hereby made to U.S. patent application Ser. Nos. 07/715,792 and 07/715,404 of Robert E. Chapin and Peter Crane, entitled "Air Bearing Slider With Relieved Trailing Edge" and filed on even date herewith.

BACKGROUND OF THE INVENTION

The present invention relates to transducer head assemblies for rotating disc drives, and more particularly to negative pressure air bearing disc head sliders.

Transducer head assemblies that "fly" relative to a rotating disc are used extensively in rotating disc drives. The assemblies include an air bearing slider for carrying a magnetic transducer proximate the rotating disc. A track accessing arm positions the slider over individual data tracks on the disc surface.

A gimbal is positioned between the slider and the track accessing arm to provide a resilient connection that allows the slider to follow the topography of the disc. The gimbal includes a dimple that is in point contact with the slider. The dimple provides a pivot about which the slider can pitch and roll while following the topography of the disc.

A conventional catamaran slider includes a pair of rails that are positioned along its edges and are disposed about a recessed area to form a pair of air bearing surfaces. As the disc rotates, the disc drags air under the slider and along the air bearing surfaces in a direction approximately parallel to the tangential velocity of the disc. As the air passes beneath the side rails, the skin friction on the air bearing surfaces causes the air pressure between the disc and the air bearing surfaces to increase which creates a hydrodynamic lifting force that causes the slider to lift and fly above the disc surface.

Self-loading negative pressure air bearing sliders (NPAB) further include a cross rail which extends between the side rails and is positioned near the slider's leading edge. The cross rail forms a subambient pressure region trailing the cross rail, between the side rails. The subambient pressure region develops negative pressure that counteracts the hydrodynamic lifting force developed along the side rails. The counter action between the positive and negative forces reduces flying height sensitivity with respect to disc velocity and increases air bearing stiffness.

As disc drives become more compact for applications in smaller and more portable equipment, rotary actuators are increasingly employed for the track accessing arm. Further, the designer is motivated to use a shorter actuator pivot arm to make the disc drives even more compact. Rotary actuators cause the geometric orientation between the disc rotation tangent and the slider's center line to change as the arm moves the slider between the inside and outside data tracks on the disc. This is known as skew or skew angle. Large skew angles make flying height control more difficult.

Flying height is viewed as one of the most critical parameters of noncontact recording. As the average flying height of the slider decreases, the transducer achieves greater resolution between individual data bit locations on the disc. Therefore, it is desirable to have the transducers fly as close to the disc as possible. Flying height is preferably uniform regardless of variable flying conditions, such as tangential velocity variation from inside to outside tracks, lateral slider movement during a seek, and varying skew angles.

Transducers have been mounted on the trailing end of the side rails. Because the slider flies with a pitch angle in which the trailing edge flies at a closer distance to the disc surface than the leading edge, the transducer is as close to the disc surface as possible when positioned at the trailing edge.

Transducers have also been mounted on a small mounting pad positioned on the center line of the slider at the trailing edge. In this position, there is more room on the trailing end of the slider for fabrication of the transducer and its terminals, relative to the position in which the transducer is mounted off to the side of the trailing end, adjacent the side rails. A disadvantage of central transducer mounting is that when the slider rolls about its pivot point, the spacing of a corner of the trailing edge becomes smaller than the spacing of the transducer. This reduces the minimum flying height of the slider and causes increased risk of slider contact with the disc surface.

Slider roll may be due to several factors. The first factor is manufacturing errors in the gimbal which attaches the slider to the track accessing arm. The second factor is dynamic forces applied to the air bearing slider by the track accessing arm during track accessing. The third factor is varying skew angles of the disc rotation tangent relative to the slider center line. When the slider flies at skew with respect to the direction of air flow, unequal pressure distribution develops between the first and second side rails. This causes the slider to fly with one rail closer to the disc surface than the other rail. As a result, the probability of contact with the disc surface at this corner increases. Therefore, the reliability of the disc drive is reduced. There is a continuing effort to develop air bearing sliders that carry a transducer as close to the disc surface as possible with a constant flying height regardless of the varying flying conditions such as disc velocity and skew angle.

SUMMARY OF THE INVENTION

The present invention is a self-loading, negative pressure-type air bearing disc head slider configured for supporting a transducer proximate a rotating disc. The slider includes a slider body having a leading edge, a trailing edge and first and second side edges. First and second side rails are positioned along the first and second side edges, respectively. A cross rail extends between the first and second side rails to define a negative pressure cavity between the cross rail, the trailing edge and the side rails. Each side rail includes a trailing edge relief which extends into a portion of the side rail from the negative pressure cavity, adjacent the trailing edge.

The first and second side rails form air bearing surfaces that develop positive pressure as the disc rotates beneath them. The trailing edge reliefs have depths which are sufficient to create regions near the trailing edge with lower pressure than the pressure developed along the air bearing surfaces. The lower pressure regions may develop subambient pressure, near ambient pressure or even positive pressure. The depth of the recessed surfaces can be varied to achieve the desired flying characteristics. The depth can be less than, equal to, or greater than the depth of the negative pressure cavity. These lower pressure regions limit build up of positive pressure near the trailing edges of the first and second side rails and shift the center of positive pressure forward along the rails toward the leading edge causing the slider to rotate (pitch) which forces the transducer closer to the disc surface. As the flying height of the transducer decreases, the transducer achieves greater resolution between individual data bit locations on the disc surface.

Because the trailing edge reliefs extend only into a portion of the side rails, the reliefs form rail end portions along the first and second side edges that extend the air bearing surfaces to the trailing edge. With this configuration, the transducer can be mounted on the trailing edge of the slider body, adjacent either the first or second side rail. When the slider flies with a positive pitch (when the trailing edge of the slider flies at a closer distance to the disc surface than the leading edge), the transducer is positioned on the slider body at the closest point to the disc surface which maximizes the resolution between individual bit positions on the disc surface.

In one embodiment, the first and second trailing edge reliefs have a depth of approximately 1.0 microns and create subambient pressure regions near the trailing edge. The subambient pressure regions "pull" the trailing edge even closer to the disc surface. The subambient pressure regions also reduce transducer flying height sensitivity to disc velocity. The tangential velocity of the rotating disc is greater at its outer diameter than at its inner diameter. As a result, the positive pressure along the first and second side rails is greater when the slider is positioned at the outer diameter which causes the slider to fly at a greater distance from the disc surface than when positioned at the inner diameter. However, the subambient pressure effects of the negative pressure cavity and the relieved trailing edges also increase with disc velocity and limit any increase in flying height. The subambient pressure created near the trailing edge increases causing the slider to rotate the trailing edge even further toward the disc surface and substantially negate increases in flying height.

DETAILED DESCRIPTION OF THE PREFERRED EMBODIMENT

Figure 1:
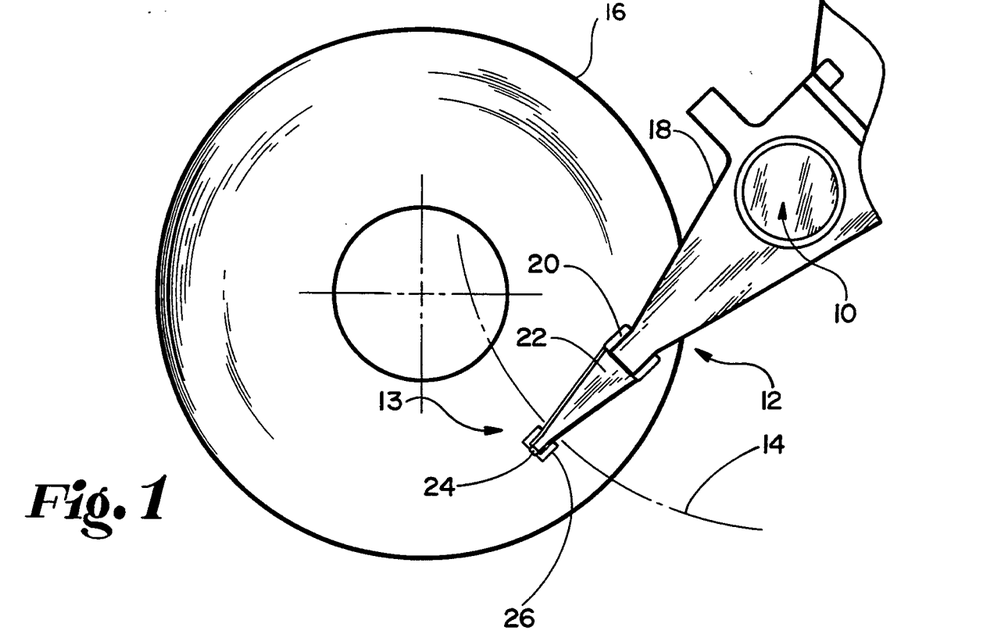
FIG. 1 is a top plan view of an air bearing disc head slider supported above a rotating disc.

The present invention is an air bearing disc head slider having first and second side rails with trailing edge reliefs. FIG. 1 is a top plan view of an air bearing disc head slider supported above a rotating disc. Actuator 10 and track accessing arm 12 support transducer head assembly 13 over disc 16 and move head assembly 13 along arc 14. Arm 12 includes supporting arm 18, base plate 20 and load beam 22. Transducer head assembly 13 includes gimbal spring 24 and air bearing disc head slider 26. Arm 12 is known as a rotatary actuating arm because actuator 10 rotates arm 12 to position slider 26 over various data tracks (not shown) on the disc surface between an outer and inner diameter.

Figure 2:
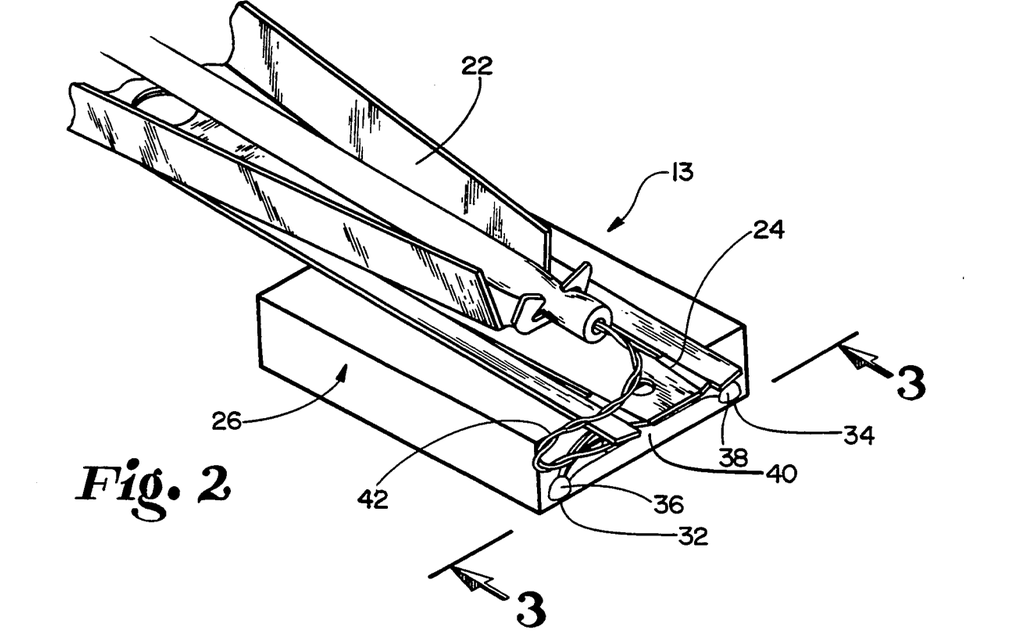
FIG. 2 is a perspective view of a transducer head assembly in accordance with the present invention.
Figure 3:
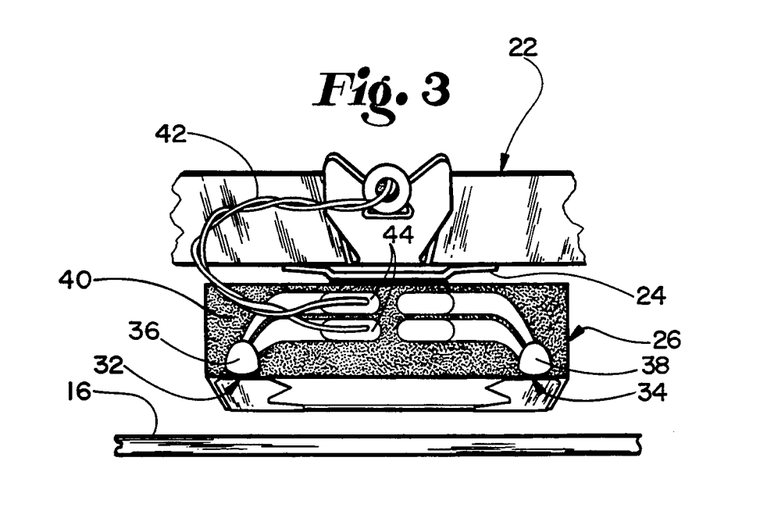
FIG. 3 is an end view of the transducer head assembly taken along line 3—3 of FIG. 2.

FIGS. 2 and 3 show transducer head assembly 13 in greater detail. FIG. 2 is a perspective view of transducer head assembly 13 supported by load beam 22. FIG. 3 is an end view of transducer head assembly 13 taken along line 3—3 of FIG. 2. Load beam 22 supplies a preload force which urges transducer head assembly 13 toward the disc surface. Assembly 13 includes gimbal spring 24 and slider 26. Gimbal spring 24 is positioned between slider 26 and load beam 22 to provide a resilient connection that allows the slider to follow the topography of the disc. Slider 26 is connected to gimbal spring 24 in a known manner, such as with an adhesive. Gimbal 24 includes a dimple (not shown) that is in point contact with slider 26. The dimple provides a pivot about which slider 26 can pitch and roll while following the topography of disc 16.

Slider 26 includes side rails 32, 34, transducers 36, 38 and trailing end 40. Transducers 36 and 38 are mounted to trailing end 40, adjacent side rails 32 and 34, respectively. Transducer 36 is electrically coupled to leads 42 at terminals 44. Transducer 36 communicates with individual bit positions on the surface of disc 16 as they pass beneath slider 26.

Figure 4:
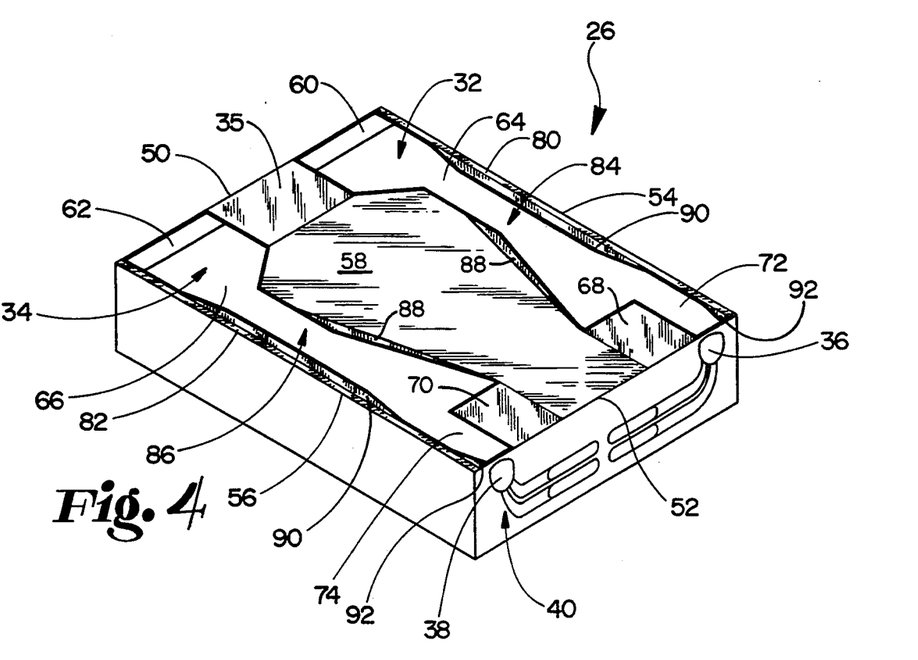
FIG. 4 is a perspective view of an air bearing disc head slider with trailing edge reliefs that create subambient pressure regions near the slider's trailing edge.

FIG. 4 is a perspective view of slider 26, as viewed from trailing end 40. Slider 26 is a selfloading, negative pressure-type air bearing slider and includes side rails 32, 34, cross rail 35, transducers 36, 38, trailing end 40, leading edge 50, trailing edge 52 and side edges 54, 56. Side rails 32 and 34 are positioned along side edges 54 and 56, respectively, and extend between leading edge 50 and trailing edge 52. Cross rail 35 extends between side rails 32 and 34 and defines a subambient or "negative pressure" cavity 58 trailing the cross rail, between side rails 32 and 34.

Side rails 32 and 34 include leading edge tapers 60 and 62, air bearing surfaces 64 and 66, and trailing edge reliefs 68 and 70, respectively. As disc 16 rotates, the disc drags air under slider 26 and along air bearing surfaces 64 and 66 in a direction generally parallel to the tangential velocity of the disc. As air passes beneath side rails 32 and 34, the skin friction on air bearing surfaces 64 and 66 cause the air pressure between disc 16 and the air bearing surfaces to increase which creates a hydrodynamic lifting force that causes slider 26 to lift and fly above the disc surface.

Leading edge tapers 60 and 62 provide faster takeoff when the disc begins to rotate by scooping more air beneath rails 32 and 34 to increase the hydrodynamic lifting force at leading edge 50. Faster takeoff decreases the length of time slider 26 slides on the disc surface before it begins to fly and thereby decreases wear on slider 26 and disc 16.

Cross rail 35 creates a subambient pressure region within subambient pressure cavity 58. The subambient pressure region develops negative pressure that counteracts positive pressure along air bearing surfaces 64 and 66. The counter action between the positive and negative forces reduces the sensitivity of slider flying height to disc velocity and increases slider stiffness.

Trailing edge reliefs 68 and 70 are formed within side rails 32 and 34, respectively. Trailing edge reliefs 68 and 70 extend into a portion of side rails 32 and 34 from negative pressure cavity 58, at trailing edge 52. Because trailing edge reliefs 68 and 70 extend only into a portion of side rails 32 and 34, the reliefs form rail end portion 72 and 74. Rail end portions 72 and 74 are positioned adjacent side edges 54 and 56, respectively, and extend air bearing surfaces 64 and 66 to trailing edge 52.

Trailing edge reliefs 68 and 70 form surfaces which are recessed from air bearing surfaces 64 and 66 by a depth sufficient to create regions near trailing edge 52 with lower pressure than the pressure developed along the air bearing surfaces. The lower pressure regions can develop subambient, near ambient or even positive pressure, depending upon the dimensions of trailing edge reliefs 68 and 70.

In the embodiment shown in FIG. 4, trailing edge reliefs 68 and 70 are recessed from air bearing surfaces 64 and 66, respectively, by a depth sufficient to form subambient pressure regions adjacent trailing edge 52. The depth of trailing edge reliefs 68 and 70 is less than the depth of negative pressure cavity 58. In one embodiment, trailing edge reliefs 68 and 70 have a depth of approximately 1 micron while negative pressure cavity 58 has a depth of approximately 4 to 12 microns.

The subambient pressure regions formed by trailing edge reliefs 68 and 70 "pull" trailing edge 52 closer to the disc surface. Trailing edge reliefs 68 and 70 also shift the center of positive pressure forward along air bearing surfaces 64 and 66 toward leading edge 50 causing slider 26 to rotate or "pitch" and force transducers 36 and 38 even closer to the disc surface. When slider 26 flies with a positive pitch, leading edge 50 flies at a greater distance from the disc surface than trailing edge 52. Pitch angle is a measurement of the degree of positive pitch.

The tangential velocity of disc 16 is greater at its outer diameter than at its inner diameter. As a result, positive pressure along air bearing surfaces 64 and 66 is greater when slider 26 is positioned at the outer diameter which causes the slider to fly at a greater distance from the disc surface than when positioned at the inner diameter. However, the subambient pressure effects of negative pressure cavity 58 and trailing edge reliefs 68 and 70 also increase with disc velocity and limit any increase in flying height. The increased subambient pressure created near trailing edge 52 by trailing edge reliefs 68 and 70 causes slider 26 to rotate the trailing edge even further toward the disc surface and substantially negate increases in flying height. Therefore, trailing edge reliefs 68 and 70 reduce transducer flying height sensitivity to disc velocity.

The trailing edges of rail end portions 72 and 74 provide sufficient area on trailing end 40 to mount transducers 36 and 38. When slider 26 flies with a positive pitch, this position provides transducers 36 and 38 with the smallest spacing from the disc surface of any point on the slider body. Transducers 36 and 38 therefore have the greatest resolution between individual bit positions on the disc surface without risking contact with the disc surface by other portions of the slider body.

Trailing edge reliefs 68 and 70 extend from trailing edge 52 toward leading edge 50 a distance of approximately one-twelfth to one-fourth of the length of slider 26. In the embodiment shown in FIG. 4, trailing edge reliefs 68 and 70 have a generally rectangular shape and form relatively narrow, rectangular rail end portions 72 and 74. However, trailing edge reliefs 68 and 70 can take other shapes, such as those shown in FIGS. 6–8 which are discussed in greater detail below.

Cross rail 35 is positioned at leading edge 50 to maximize the advantages of the self-loading bearing by making negative pressure cavity 58 as large as possible. Cross rail 35 is recessed from air bearing surfaces 64 and 66 by approximately 0 to 2.0 microns. In another embodiment the cross rail is coplanar with air bearing surfaces 64 and 66. The recessed cross rail 35 minimizes debris collection at the leading edge which can shed occasionally and drag between slider 26 and the disc, causing increased wear to air bearing surfaces 64 and 66 and to the disc surface. The recess also reduces increase in pitch angle caused by positioning cross rail 35 at leading edge 50. A very high pitch angle degrades the stiffness of the air bearing. Various other flying characteristics are also improved, such as reduced flying height sensitivity to altitude and higher vertical and roll stiffness. This configuration is discussed in greater detail in copending U.S. patent application Ser. No. 07/715,404, of Robert E. Chapin and Peter Crane, entitled "Self-loading Bearing With Relieved Leading Edge", filed on even date herewith.

Side edges 54 and 56 include edge steps 80 and 82, respectively. Edge steps 80 and 82 extend from leading edge 50 to trailing edge 52. Edge steps 80 and 82 are recessed from air bearing surfaces 64 and 66, by a depth of approximately 10 microns. Edge steps 80 and 82 are provided to precisely define the width of air bearing surfaces 64 and 66 between side edges 54 and 56. Edge steps 80 and 82 remain substantially at ambient pressure.

Air bearing surfaces 64 and 66 narrow in width through central sections 84 and 86, respectively, between leading edge 50 and trailing edge 52. The narrow central sections 84 and 86 reduce the effect of skew angle on flying height over disc 16. With rotary actuator arms, the angle between the disc's rotational tangent and a longitudinal axis of the slider varies as the arm rotates to position slider 26 over various data tracks on the disc surface. As disc 16 rotates, the positive pressure, which builds along air bearing surfaces 64 and 66, tends to peak near central sections 84 and 86. The narrow central sections 84 and 86 allow a portion of the peak pressure to bleed off the air bearing surfaces to provide an overall smoother pressure distribution along air bearing surfaces 64 and 66. The smoother pressure distribution provides slider 26 with greater flying height stability over various skew angles. These features are discussed in greater detail in copending U.S. patent application Ser. No. 07/528,936, filed May 25, 1990, issued as U.S. Pat. No. 5,062,017, and entitled "Hour-Glass Disk Head Slider".

The hourglass shape of each rail improves pitch stiffness of the air bearing about the gimbal pivot point. Because the air pressure bleeds off near narrow central sections 84 and 86, the "area elements" of the air bearing surfaces 64 and 66 having vertical stiffness (formed by positive pressure) are concentrated near leading edge 50 and trailing edge 52 of slider 26, remote from the pivot point. Thus, the vertical stiffness of each area element is "multiplied" by a longer moment arm to give a higher pitch stiffness.

Side rails 32 and 34 further include inside edges with shallow edge steps 88 and outside edges with shallow edge steps 90. Edge steps 88 and 90 extend along a portion of a length of side rails 32 and 34 and form the hourglass shapes of air bearing surfaces 64 and 66. In one embodiment, edge steps 88 and 90 are recessed from air bearing surfaces 64 and 66 by a depth of approximately 0 to 2.0 microns. The outside edges of side rails 32 and 34 further include shallow edge steps 92 which are positioned substantially at trailing edge 52 and have a depth of about 0 to 2.0 microns.

When slider 26 flies at skew with respect to the disc's tangential velocity, edge steps 88 and 90 accumulate additional pressure that prevents slider 26 from losing flying height. This results in a more even flying height at varying skew angles.

Figure 5:
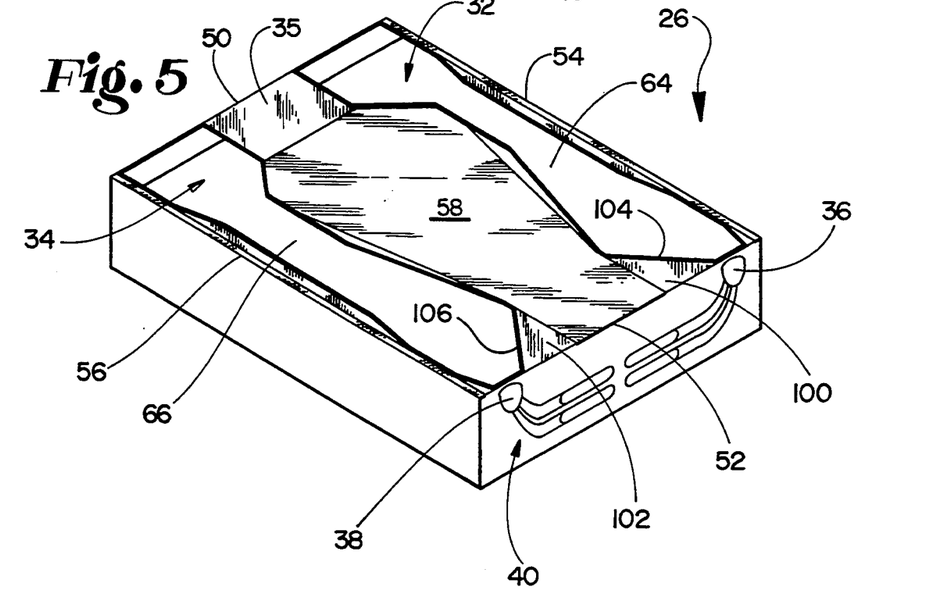
FIGS. 5-8 are perspective views of air bearing disc head sliders which illustrate alternative embodiments of the trailing edge reliefs shown in FIG. 4.

FIG. 5 is a perspective view of slider 26 which illustrates an alternative embodiment of the trailing edge reliefs. The same reference numerals have been used throughout the figures to indicate similar elements. Slider 26 includes side rails 32, 34, cross rail 35, transducers 36, 38, trailing end 40, leading edge 50, trailing edge 52, first and second side edges 54, 56 air bearing surfaces 64 and 66, and negative pressure cavity 58. Side rails 32 and 34 include trailing edge reliefs 100 and 102, respectively. Trailing edge reliefs 100 and 102 each have a generally triangular shape. Trailing edge reliefs 100 and 102 are defined by angled line segments 104 and 106, respectively, which extend from negative pressure cavity 58 toward trailing edge 52. Similar to the embodiment shown in FIG. 4, trailing edge reliefs 100 and 102 have a depth sufficient to form subambient pressure regions adjacent the trailing edge of side rails 32 and 34 as disc 16 rotates beneath them.

Figure 6:
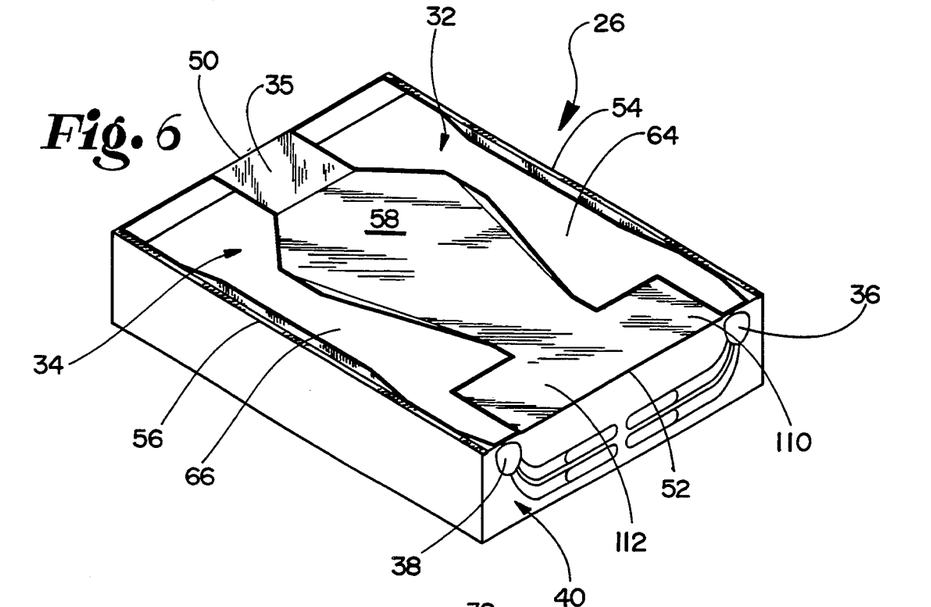

FIG. 6 is a perspective view of slider 26 which illustrates another alternative embodiment of the trailing edge reliefs. In this embodiment side rails 32 and 34 include rectangular-shaped trailing edge reliefs 110 and 112 which are recessed from air bearing surfaces 64 and 66 by a depth sufficient to create near ambient pressure regions adjacent trailing edge 52. The depth of trailing edge reliefs 110 and 112 can be substantially equal to or even greater than the depth of negative pressure cavity 58 (about 4 to 12 microns). These near ambient pressure regions reduce the positive pressure along air bearing surfaces 64 and 66 near trailing edge 52, which shifts the center of positive pressure forward along the air bearing surfaces toward leading edge 50. This causes slider 26 to rotate trailing edge 52 (and therefore transducers 36 and 38) toward the surface of disc 16, thereby increasing the resolution of transducers 36 and 38.

Figure 7:
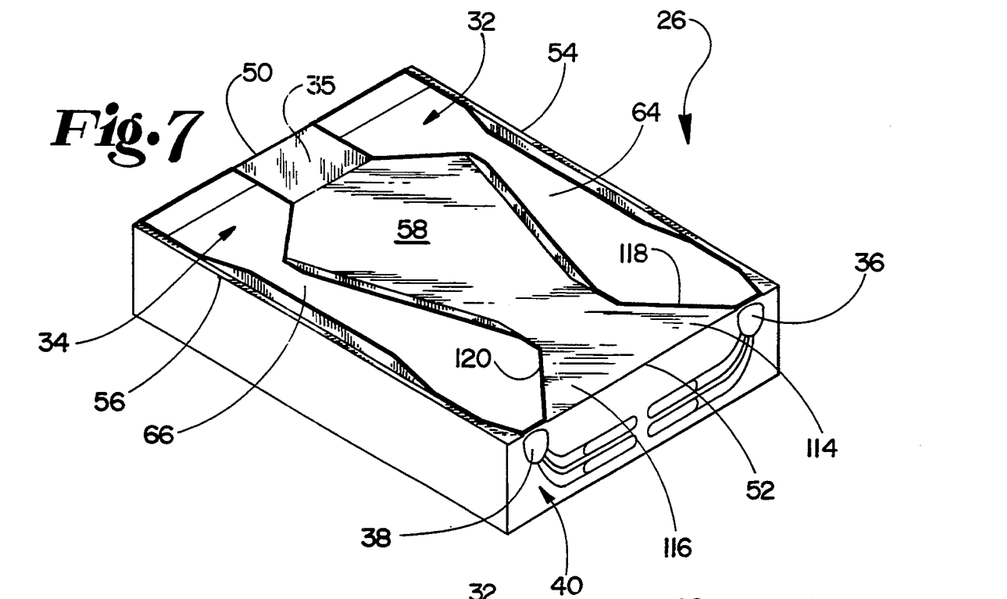

FIG. 7 is a perspective view of slider 26 which illustrates another alternative embodiment of the trailing edge reliefs. Side rails 32 and 34 include trailing edge reliefs 114 and 116. Trailing edge reliefs 114 and 116 are recessed from air bearing surfaces 64 and 66 by a depth substantially equal to the depth of negative pressure cavity 58, similar to the embodiment shown in FIG. 6. However, trailing edge reliefs 114 and 116 each have a generally triangular shape defined by angled line segments 118 and 120, respectively. Angled line segments 118 and 120 extend from negative pressure cavity 58 toward trailing edge 52. The trailing edge reliefs 114 and 115 operate in a similar manner to trailing edge reliefs 110 and 112 shown in FIG. 6.

Figure 8:
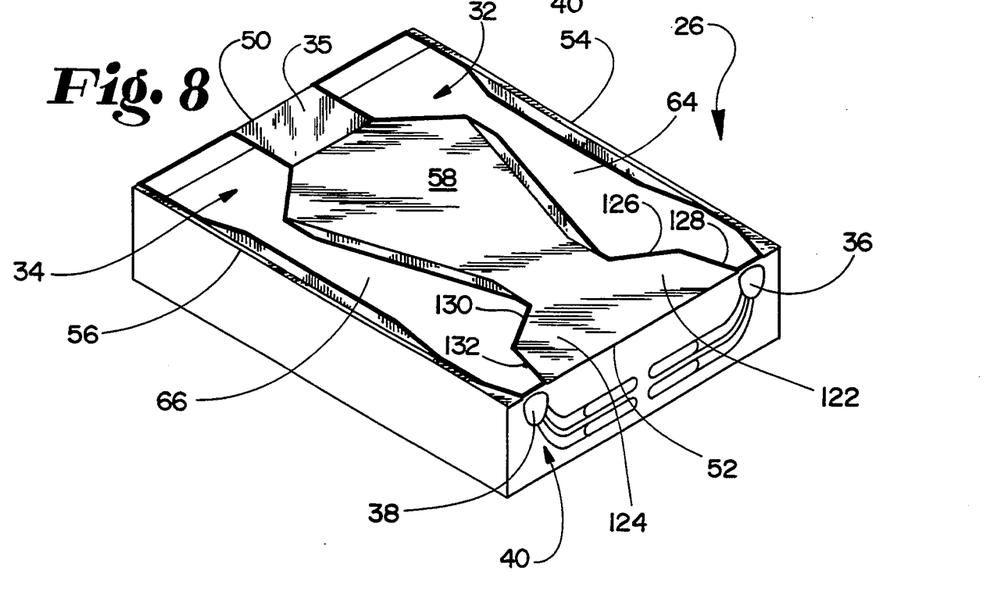

FIG. 8 is a perspective view of slider 26 which illustrates yet another alternative embodiment of the trailing edge reliefs. Side rails 32 and 34 include trailing edge reliefs 122 and 124, respectively. Trailing edge reliefs 122 and 124 are defined by a pair of intersecting line segment pairs 126, 128 and 130, 132 which extend from negative pressure cavity 58 toward trailing edge 52. Although trailing edge reliefs 122 and 124 are defined by pairs of line segments, further alternative embodiments of the trailing edge reliefs can be formed by a plurality of line segments extending at various angles from negative pressure cavity 58 toward trailing edge 52. Trailing edge reliefs 122 and 124 can also be formed by curved line segments.

In each of the embodiments shown in the figures, the trailing edge reliefs extend from the negative pressure cavity into a portion of the first and second side rails and form rail end portions that extend the air bearing surfaces to the trailing edge, along the first and second side edges. This configuration provides the advantages of shifting the center of positive pressure forward along the air bearing surfaces causing the slider to rotate the trailing edge toward the disc surface and thereby achieve greater resolution between individual bit positions on the disc surface with the transducers. These advantages are achieved while maintaining sufficient area on the trailing end of the first and second side rails on which to mount the transducers. In this position, the transducers have the smallest spacing from the disc surface with respect to any other point on the slider body.

In the embodiments shown in FIGS. 4 and 5 the trailing edge reliefs have depths sufficient to form subambient pressure regions adjacent the trailing edge. These subambient pressure regions pull the transducers even closer to the disc surface to achieve even greater resolution between individual bit positions on the disc surface. These subambient pressure regions also decrease transducer flying height sensitivity to changes in disc velocity between inside and outside data tracks.

Although the present invention has been described with reference to preferred embodiments, workers skilled in the art will recognize that changes may be made in form and detail without departing from the spirit and scope of the invention. For example, the trailing edge reliefs of the present invention may be used with other forms of sliders such as a "catamaran-type" slider in addition to the NPAB sliders disclosed herein.

What is claimed is:

1. A slider configured for supporting a transducer proximate a rotating disk, the slider comprising:
   a slider body;
   first and second raised air bearing surfaces which are positioned on the slider body and are generally parallel to one another, the first and second raised air bearing surfaces each having leading and trailing edges and inside and outside edges;
   first and second trailing edge reliefs extending into the first and second raised air bearing surfaces, respectively, from the trailing edges toward the leading edges and communicating with one of the inside and outside edges, the first and second trailing edge reliefs forming third and fourth raised air bearing surfaces, respectively, which interact with the disc as the disc rotates proximate to the slider, wherein the third and fourth raised air bearing surfaces are raised from the slider body, extend in a plane which is parallel to the first and second raised air bearing surfaces, and are recessed from the first and second air bearing surfaces by a substantially constant depth; and
   wherein the transducer is positioned along the trailing edges of one of the first and second air bearing surfaces.

2. The slider of claim 1 wherein the slider body has a length and the first and second trailing edge reliefs extend from the trailing edges toward the leading edges for a distance that is about 1/12 to ¼ the length of the slider body.

3. The slider of claim 1 wherein:
the first raised air bearing surface includes a first narrow, rail end portion which extends from the trailing edge toward the leading edge of the first air bearing surface, generally parallel to the first trailing edge relief; and
the second raised air bearing surface includes a second narrow, rail end portion which extends from the trailing edge toward the leading edge of the second airbearing surface, generally parallel to the second trailing edge relief.

4. The slider of claim 1 wherein the depths of the third and fourth raised air bearing surfaces are approximately 1.0 microns.

5. The slider of claim 1 wherein the depths of the third and fourth air bearing surfaces are approximately 4.0 to 12.0 microns.

6. A slider configured for supporting a transducer proximate a rotating disc, the slider comprising:
a slider body having a leading edge, a trailing edge and first and second side edges;
first and second raised side rails positioned along the first and second side edges, respectively, the first and second raised side rails forming first and second respective air bearing surfaces with inside and outside edges;
a cross rail extending between the first and second raised side rails and forming a subambient pressure cavity between the cross rail, the trailing edge and the first and second raised side rails, the subambient pressure cavity having a depth which is measured from the first and second air bearing surfaces; and
first and second trailing edge relief means for limiting buildup of positive pressure at the trailing edge and for shifting a center of positive pressure forward along the first and second air bearing surfaces toward the leading edge, the first and second trailing edge relief means being formed within the first and second raised side rails, respectively, with each trailing edge relief means extending forward from the trailing edge into a portion of the raised side rail and communicating with one of the inside and outside edges, the first and second trailing edge relief means being so sized and arranged as to form respective third and fourth air bearing surfaces which interact with the disc as the disc rotates proximate to the slider, the third and fourth air bearing surfaces extending in a plane which is parallel to the first and second air bearing surfaces having a substantially constant depth which is measured from the first and second air bearing surfaces, wherein the depth of the third and fourth air bearing surfaces is less than the depth of the subambient pressure cavity.

7. The slider of claim 6 wherein the depths of the third and fourth air bearing surfaces are sufficient to form subambient pressure regions adjacent the trailing edge of the slider body.

8. The slider of claim 6 wherein the subambient pressure cavity depth is approximately 4.0 to 12.0 microns and the depths of the third and fourth air bearing surfaces are approximately 4.0 to 12.0 microns.

9. The slider of claim 6 wherein the subambient pressure cavity depth is approximately 4.0 to 12.0 microns and the depths of the third and fourth air bearing surfaces are approximately 1.0 microns.

10. The slider of claim 6 wherein the first and second raised side rails include first and second rail end portions, respectively, which are coplanar with the first and second air bearing surfaces and extend along and generally parallel to the first and second trailing edge relief means and wherein the transducer is positioned along the trailing edge, adjacent one of the first and second rail end portions.

11. The slider of claim 10 wherein the first and second trailing edge relief means and the first and second rail end portions have rectangular shapes.

12. The slider of claim 10 wherein the first and second trailing edge relief means and the first and second rail end portions are each defined by at least one angles line segment extending from the subambient pressure cavity toward the trailing edge.

13. The slider of claim 12 wherein the first and second trailing edge relief means and the first and second rail end portions have generally triangular shapes.

14. The slider of claim 12 wherein the first and second trailing edge relief means and the first and second rail end portions are each defined by a plurality of intersecting line segments that extend from the subambient pressure cavity toward the trailing edge.

15. The slider of claim 6 wherein the first and second trailing edge relief means extend from the trailing edge toward the leading edge for a distance that is approximately 1/12 to ½ of a length of the slider, as measured from the leading edge to the trailing edge.

16. The slider of claim 6 and further including first and second edge steps positioned along the first and second side edges, respectively.

17. The slider of claim 16 wherein the first and second edge steps have a depth measured from the first and second air bearing surfaces of approximately 10 microns.

18. The slider of claim 6 wherein the first and second air bearing surfaces narrow in width from the leading edge to a central section and widen from the central section toward the trailing edge.

19. The slider claim 18 wherein the first and second air bearing surfaces include inside and outside edge steps extending along a portion of a length of the air bearing surfaces, as measured from the leading edge to the trailing edge, with the inside and outside edge steps having depths measured from he first and second air bearing surfaces of up to about 2.0 microns.

20. The slider of claim 6 wherein the first and second raised side rails include outside edge steps which are positioned substantially at the trailing edge and are recessed by depths of up to about 2.0 microns from the first and second air bearing surfaces.

21. The slider of claim 6 wherein the cross rail is positioned at the leading edge.

22. The slider of claim 6 wherein the cross rail is recessed from the first and second air bearing surfaces by a depth of up to about 2.0 microns.

23. A self-loading air bearing disc head slider configured for supporting a transducer proximate a rotating disc, the slider comprising:
a slider having a leading edge, a trailing edge and first and second side edges;
first and second raised side rails positioned along the first and second side edges, respectively, the first and second raised side rails forming coplanar air bearing surfaces which narrow in width from the leading edge toward a central section and widen from the central section toward the trailing edge;

a cross rail positioned at the leading edge and extending between the first and second raised side rails;

a subambient pressure cavity positioned between the cross rail, the trailing edge and the first and second raised side rails;

first and second trailing edge reliefs formed within a portion of the first and second raised side rails, respectively, and extending forward from the trailing edge, each of the reliefs having a depth and an area sufficient to limit buildup of positive pressure at the trailing edge and to shift a center of positive pressure forward along the air bearing surfaces toward the leading edge, wherein the depth is measured from the air bearing surfaces;

first and second rail end portions positioned adjacent the first and second trailing edge reliefs, respectively, which extend from the air bearing surfaces to the trailing edge and which include surfaces that are coplanar with the air bearing surfaces; and wherein the transducer is positioned along the trailing edge, adjacent one of the first and second raised side rails.

24. The slider of claim 23 wherein the depth of the first and second trailing edge reliefs is substantially constant and is approximately 1.0 microns.

25. The slider of claim 25 wherein the depth of the first and second trailing edge reliefs is substantially constant and is approximately 4.0 to 12.0 microns.

26. The slider of claim 23 wherein the first and second trailing edge reliefs have generally rectangular shapes.

27. The slider of claim 23 wherein the first and second trailing edge reliefs are each defined by at least one angled line segment extending toward the trailing edge.

28. The slider of claim 27 wherein the first and second trailing edge reliefs have generally triangular shapes.

29. The slider of claim 23 wherein the air bearing surfaces include inside and outside edge steps extending along a portion of a length of the air bearing surfaces, as measured from the leading edge to the trailing edge, and wherein the inside and outside edge steps have depths measured from the air bearing surfaces of up to about 2.0 microns.

* * * * *

UNITED STATES PATENT AND TRADEMARK OFFICE
CERTIFICATE OF CORRECTION

PATENT NO. : 5,343,343

DATED : August 30, 1994

INVENTOR(S) : ROBERT E. CHAPIN

It is certified that error appears in the above-indentified patent and that said Letters Patent is hereby corrected as shown below:

On the Title Page of the Patent in the Related U.S. Application Data Section, delete "June 15, 1991", insert --June 14, 1991--

Col. 1, line 17, after "Trailing Edge" and ", insert --Self-Loading Air Bearing Slider With A Relieved Leading Edge--

Col. 3, line 66, delete "EMBODIMENT", insert --EMBODIMENTS--

Col. 5, line 8, delete "portion", insert --portions"

Col. 8, line 61, after "first and second", delete "raised"

Col. 9, line 13, delete "airbearing", insert --air bearing--

Col. 9, line 53, before "having", insert --and--

Col. 10, line 16, delete "angles", insert --angled--

Col. 10, line 48, delete "he", insert --the--

Col. 10, line 63, after "slider", insert --body--

UNITED STATES PATENT AND TRADEMARK OFFICE
CERTIFICATE OF CORRECTION

PATENT NO. : 5,343,343

DATED : August 30, 1994

INVENTOR(S) : Robert E. Chapin

It is certified that error appears in the above-indentified patent and that said Letters Patent is hereby corrected as shown below:

Col. 12, line 7, delete "claim 25", insert —claim 23—

Signed and Sealed this

Seventeenth Day of January, 1995

Attest:

BRUCE LEHMAN

Attesting Officer

Commissioner of Patents and Trademarks